RADIO DISTANCE MEASURING SYSTEMS

Filed July 9, 1956 2 Sheets-Sheet 1

INVENTORS:
Mervyn Morgan, Jack Wild
and Robert William Duncan
BY: Baldwin & Wight
ATTORNEYS Sept. 8, 1959 M. MORGAN ET AL 2,903,692

RADIO DISTANCE MEASURING SYSTEMS

Filed July 9, 1956 2 Sheets-Sheet 2

INVENTORS:
Mervyn Morgan, Jack Wild
and Robert William Duncan
BY: Baldwin & Wight
ATTORNEYS United States Patent Office 2,903,692

Patented Sept. 8, 1959

2,903,692

RADIO DISTANCE MEASURING SYSTEMS

Mervyn Morgan and Jack Wild, Chelmsford, and Robert William Duncan, Great Baddow, England, assignors to Marconi's Wireless Telegraph Company Limited, London, England, a British company Application July 9, 1956, Serial No. 596,781

Claims priority, application Great Britain July 12, 1955

2 Claims. (Cl. 343—12)

Figure 1:
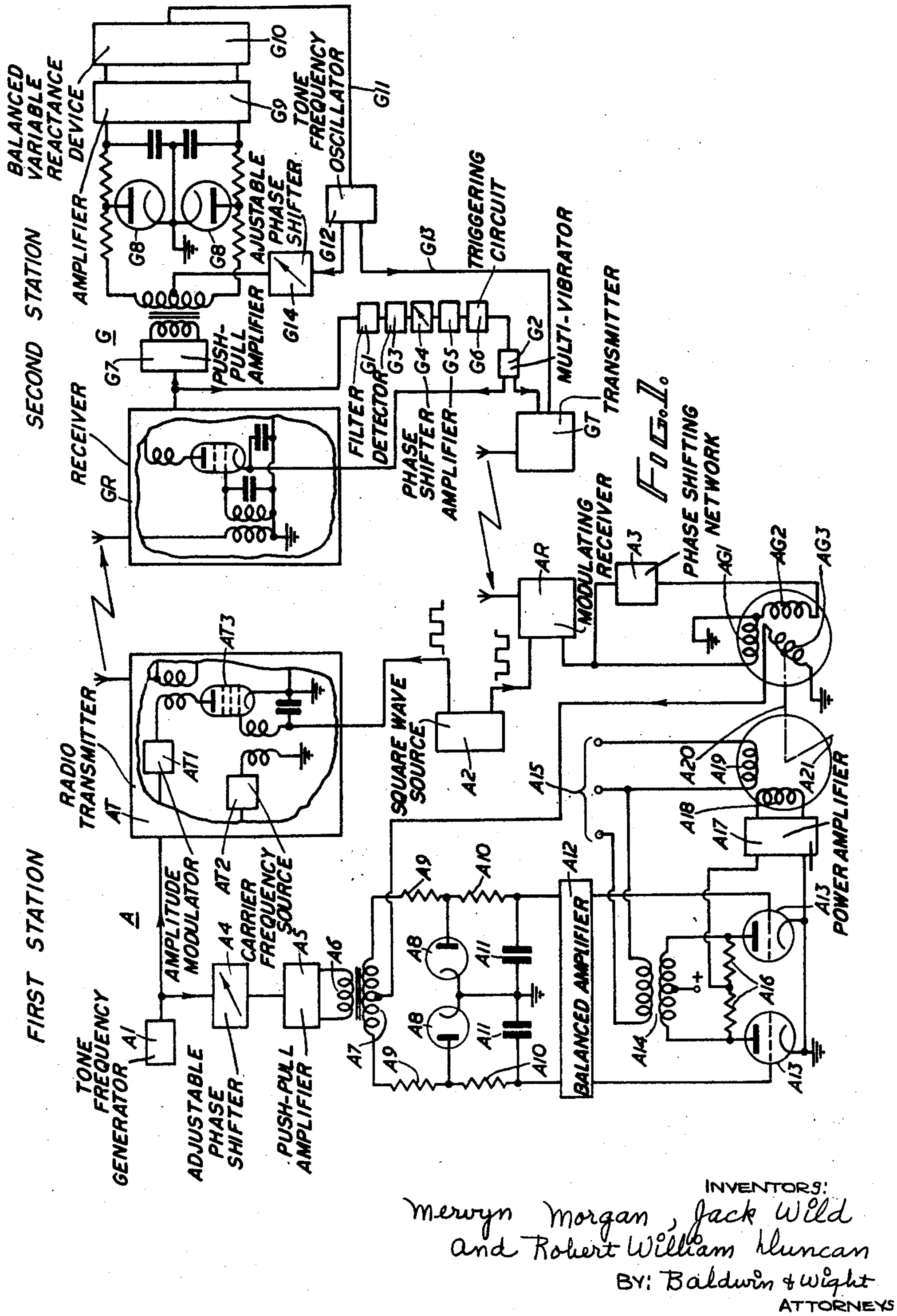

This invention relates to radio distance measuring systems and more particularly to such systems of the kind wherein the distance between two stations is ascertained by measuring in terms of the phase shift of a modulating frequency the propagation time in effecting radio transmission from one station to the other and back again.

Radio distance measuring systems of this kind are well known. In general such a known system comprises at the interrogating station (commonly an air-borne station) a transmitter which transmits a tone modulated carrier wave to the interrogated station (usually a ground station) which received the modulated carrier, demodulates it, and transmits the tone frequency back as a modulation of a second carrier. This second carrier is received at the first station and demodulated and the resultant tone frequency phase compared with the original tone frequency at that station to determine the distance between the two stations. Obviously the further the distance between the two stations, the more will be the phase shift produced between the original tone frequency and that received at the interrogating station as a modulation of the second carrier, and if incidental phase shifts in different parts of the apparatus of the two stations are known or dealt with by suitable fixed phase adjustments, a phase comparison between the original tone frequency and that received on the second carrier frequency will be a direct measure of the distance between the two stations.

Known systems as above described operate quite effectively and satisfactorily but have the serious disadvantage that they involve simultaneous transmission and reception in both directions and involve the use of two different carrier frequencies. This means the use of more or less bulky, heavy and expensive apparatus—a considerable practical disadvantage, especially where the interrogating station is airborne. The present invention has for its object to provide improved radio distance measuring systems of the kind referred to wherein only one carrier frequency is used for transmission and reception in both directions. This carrier frequency may, in practice, conveniently be a carrier frequency used at other times for other purposes, for example, for very high frequency telephonic communication. The invention thus offers the substantial advantage of simplification of apparatus.

According to this invention, a radio system for measuring the distance between two stations comprises, at the first station, a source of modulating frequency, a transmitter adapted to transmit that modulating frequency as a modulation of carrier wave of a predetermined carrier frequency, a receiver adapted to receive a carrier wave of said predetermined frequency and demodulate the same, switching means for periodically and alternately rendering said transmitter and receiver operative so that when the transmitter is operating, the receiver is not, and vice versa, and means for phase comparing the modulating frequency applied to the transmitter with a similar modulation frequency obtained by demodulation at the receiver: and, at the second station, a receiver adapted to receive a carrier wave of said predetermined frequency and demodulate the same, a transmitter adapted to transmit a carrier wave of said predetermined frequency means for modulating the transmitted carrier wave with a modulating frequency in fixed predetermined phase relation to the modulating frequency at said receiver, switching means for periodically and alternately rendering said transmitter and receiver operative so that when the transmitter is operating, the receiver is not, and vice versa, and synchronising means for synchronising the switching means with the corresponding switching means at the first station, so that the periods of operability of the receiver at the second station correspond with the periods of operability of the transmitter at the first station. Preferably the switching means at the two stations are constituted by electronic switching means.

Preferably also said fixed predetermined phase relation is the in-phase relation.

The modulating frequency of the transmission from the second station may be locally generated there and maintained in the required phase relationship with the modulating frequency as received there by means of a phase discriminator control circuit responsive to the phase relation between the modulating frequency as received and the modulating frequency as locally generated and operative to control the phase of the latter. Alternatively the modulating frequency transmitted from said second station may be directly derived from the modulating frequency received by passing the same through a time delay circuit.

Figure 2:
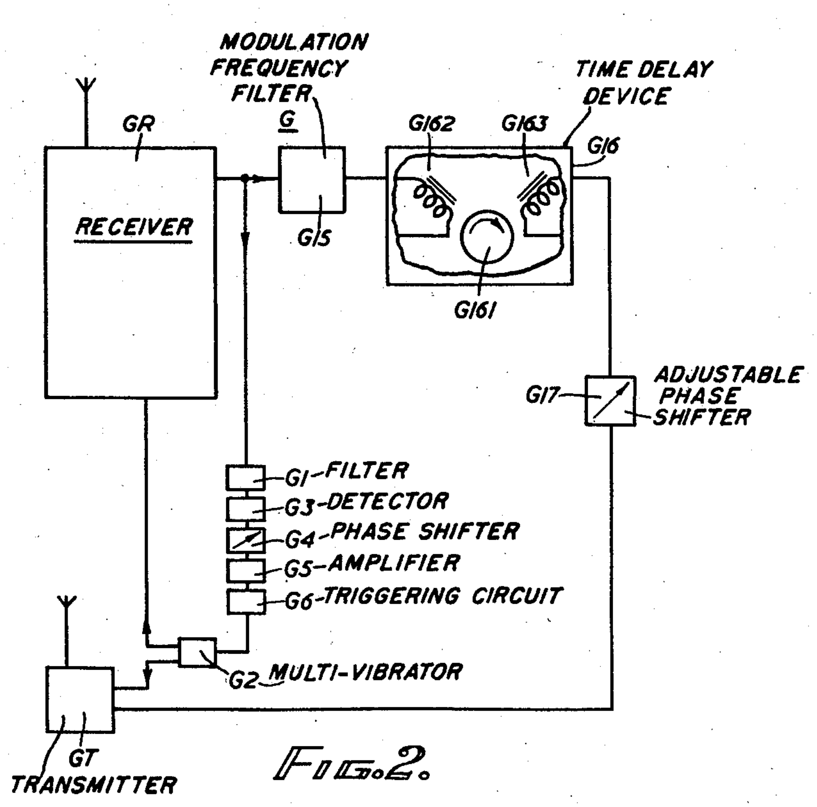

The invention is illustrated in the accompanying drawings in which Fig. 1 shows diagrammatically, and so far as is necessary to an understanding of the invention, a complete system of two stations embodying the invention, and wherein the modulating frequency transmitted from the interrogated station is locally generated, while Fig. 2 shows an alternative form of interrogated station wherein the modulating frequency transmitted is derived by time delaying the modulating frequency received.

Referring to Fig. 1, the system therein shown comprises two stations, an interrogating station (assumed to be an airborne station) indicated by the general reference letter A, and an interrogated station (assumed to be a ground station) indicated by the general reference letter G. At station A there is a radio transmitter AT operating, for example, at a carrier frequency of 130 mc./s., and transmitting said carrier amplitude modulated by a tone frequency of, for example, 350 c./s., produced by a tone frequency generator A1. This tone frequency is applied to an amplitude modulator AT1 which amplitude modulates in a power amplifier AT3 the carrier frequency derived from a carrier frequency drive source AT2. The transmitter, more specifically the power amplifier valve AT3, is alternately and periodically switched on and off by a switching square wave of, for example, 40 c./s., derived from a square wave source A2 such as a multivibrator and applied as conductively controlling bias to the valve AT3. The station also includes a demodulating receiver AR tuned to the same carrier frequency (130 mc./s.) and which is switched on and off by control bias applied to one of its valves from the square wave source A2. This source supplies two square wave outputs in phase opposition as conventionally indicated alongside the leads leading respectively to the transmitter AT and the receiver AR. Assuming the receiver AR to receive a carrier modulated with the same tone frequency (350 c./s.), the said tone frequency resulting from demodulation is applied to the mutually perpendicular stator coils AG1 and AG2 of a goniometer or synchro-resolver or equivalent device through two paths, one of which includes a phase shifting network A3 adapted to introduce a phase shift of 90° in relation to that produced in the other path. The rotor coil of the goniometer is indicated at AG3.

Output from the source A1 is also fed through an adjustable phase shifter A4 adapted to give a phase shift of 90° plus or minus a small adjustable phase shift to compensate for inherent phase shifts elsewhere in the apparatus, and a push-pull amplifier A5 to the primary A6 of a transformer whose secondary A7 is the input coil of a phase discriminator including diodes A8 and resistors A9. The output of the rotor coil AG3 is fed to the mid-point of the coil A7. The phase discriminator shown is well known per se (any other suitable form of phase discriminator may be used) and will supply between the anodes of the diodes A8 a D.C. potential difference whose polarity and magnitude are respectively dependent upon the sense and extent of the departure from phase quadrature of the phase difference between the input to the phase discriminator from the coil A6 and the input from the coil AG3. This D.C. output, filtered by a filter comprising resistances A10 and condensers A11, is amplified by a balanced amplifier A12 and applied between the control grids of a pair of valves A13. A transformer A14 applies between the anodes of the valves A13 (in superimposition on the D.C. anode potential) an A.C. potential taken from one phase of a power system or other two-phase supply, the three terminals of which are indicated at A15. Output from the centre tap of a resistance A16 between the anodes of the valves A13 is taken via a power amplifier A17 to one field winding A18 of a two-phase motor. The other field winding A19 of this motor is fed directly from the second phase of the two-phase supply and its rotor is mechanically connected, as indicated by the chain line A20, to the rotor coil AG3 to rotate the same. It will be seen that with this arrangement, the rotor coil AG3 will be rotated by the two-phase motor until there is zero output from the phase discriminator, and since this will only occur when the input to said discriminator from the coil AG3 and that to the discriminator from the coil A6 are in quadrature, the rotary position of the coil AG3 at any time will indicate the phase relation between the modulation from the receiver AR and the tone frequency from the source A1.

The ground station G has a receiver GR for receiving the transmission from transmitter AT and a transmitter GT for transmitting to the receiver AR. The same carrier frequency is used throughout. The transmitter and receiver are alternately switched into operation in much the same way as are the transmitter and receiver AT, AR, at station A, this switching being effected by square waves delivered from a multi-vibrator G2 corresponding in function to the square wave source A2 at station A. The multi-vibrator G2 is synchronized to ensure that transmitter AT and receiver GR are operative together, and transmitter GT and receiver AR are operaive together. This synchronization is achieved by feeding demodulated output from the receiver GR through a 350 c./s. filter G1 to a detector G3 which rectifies the same and feeds through an adjustable phase shifter G4 to an amplifier G5 which selectively amplifies the switching frequency of 40 c./s. The output of this amplifier is fed to a Schmitt trigger or like known circuit G6 (this preferably includes a differentiating circuit for translating the normal square wave output into a series of peaks) which is employed in well known way to synchronize the multi-vibrator G2. As the parts represented by the blocks G1 to G6 inclusive are all well known per se, further description thereof is unnecessary.

Demodulated output from the receiver GR is also fed through a push-pull amplifier G7 to a phase discriminator and filter circuit including diodes G8 and generally similar to the discriminator and filter circuit including the diodes A8 at station A. Filtered output from the phase discriminator is amplified by a balanced D.C. amplifier G9 and employed to control a balanced variable reactance device G10 of any well known form (for example, a balanced Miller valve circuit) adapted to manifest a reactance representative of the D.C. potential fed into it. This reactance is included via lead G11 in the frequency determining circuit of a tone frequency oscillator G12 having a nominal frequency of 350 c./s., i.e. the modulating frequency assumed employed. Output from this oscillator is fed as modulation to the transmitter GT over lead G13 and is also fed via an adjustable phase shifter G14 to the middle point of the secondary of the transformer through which the phase discriminator is fed from the push-pull amplifier G7. The parts G10 and G12 are too well known to require description here. It will be apparent that the oscillator G12 will be automatically controlled as to phase, so as to maintain an in-phase relation between the oscillations generated thereby and the modulation from the amplifier G7, i.e. as received by the receiver GR.

By suitably adjusting the phase shifters, the result can obviously be achieved that when the separation of the two stations is zero, the modulation received by the receiver AR from the transmitter GT will be in phase with that received by the receiver GR from the transmitter AT, so that the position taken up by the rotor coil AG3 will be that corresponding to zero separation. A remote indicator operated by the two-phase motor at station A may then be calibrated to indicate zero in these conditions. No remote indicator is shown in Fig. 1, but the chain line A21 represents the drive to such an indicator. In the simplest case the indicator used may be simply a pointer on the goniometer shaft and moving over a distance scale. Any departure from this in-phase relation will be a measure of the separation of the two stations and will be indicated by the indicator.

Although only a single modulating frequency is assumed to be used in the system of Fig. 1, it is of course to be understood that more than one modulating frequency may be available for selective use in accordance with known practice in distance measuring systems of the kind in question so that a low modulating frequency is available for use for coarse measurement of distance and a higher one for use for fine measurement of distance. In this way fine distance measurement is possible over long distances without ambiguities due to the fact that such distances may correspond to phase shifts of more than 360° at the frequency used for fine measurement. This use of alternative frequencies for coarse and fine measurement is well known per se and being common practice requires no further description here.

Fig. 2 shows a modified form of interrogated ground station G which can be substituted for the station G of Figure 1 in a system otherwise as shown in Fig. 1. The essential difference between the ground stations of Figs. 1 and 2 is that in the former the modulation frequency is generated locally by a generator controlled as to its phase by the received modulation, whereas in the station of Fig. 2 the re-transmitted modulation frequency is derived directly from the received frequency. Like references are used for like parts in Figs. 1 and 2. The transmitter-receiver switching in Fig. 2 is as in Fig. 1. The demodulated output from the receiver GR is however passed through a modulation frequency filter G15 to a delay device G16, the delayed resultant being fed through an adjustable phase shifter G17 to modulate the transmitter GT. The delay introduced by the delay device G16 plus any provided by the adjustable phase shifter G17 are made such that an inphase relation exists between the modulation as received at the receiver GR and as transmitted from the transmitter GT. The delay device G16 may be of any convenient suitable nature, for example, an artificial line. It is, however, represented diagrammatically in Fig. 2 as of the well known recording type comprising a magnetic recording cylinder G161 driven at constant speed and on which the modulation signals are recorded by a magnetic recording head G162, and picked up again by a magnetic pick-up head G163, the delay between recording and pick-up being determined by the time taken by the magnetic surface to pass between the two heads. A wipe-out coil (not shown) is of course provided to wipe out the recorded matter after it has been picked up.

It will be observed that an interrogating station of a system in accordance with this invention essentially includes means for indicating the phase relation between a received modulation frequency and a modulation frequency produced in the station. Such an interrogating station may, therefore, be readily arranged so that it can be used at will to indicate any intelligence transmitted to it in the form of a phase-shifted signal of the same frequency as that produced in the station. If, therefore, the interrogated ground station is equipped with apparatus as known per se for obtaining the bearing of the interrogating station, and translating that bearing into a shift of phase of modulation received from the interrogating station, the same apparatus at the interrogating station can be used to obtain not only distance from the interrogated station but also bearing, if the second station re-transmits with the additional phase shift representative of ascertained bearing. If, for example, an interrogating station which has obtained its distance as already described makes a special signal indicating that it wants its bearing also, and the interrogated station in response to that signal takes the bearing and then transmits the modulation with a further or additional phase shift representative of that bearing, the indicator at the interrogating station will of course change its indication in response to the additional phase shift introduced, and the difference between the indication originally obtained (giving distance) and the changed indication will be representative of the bearing of the interrogating station.

We claim:

1. In a radio system for measuring the distance between two stations, a pair of related radio stations, including at the first station a source of modulating frequency, a transmitter adapted to transmit the modulating frequency as a modulation of a carrier wave, a receiver adapted to receive said modulating frequency and demodulate the same, switching means for periodically and alternately rendering said transmitter and said receiver operative, means for phase comparing the modulating frequency applied to the transmitter with a similar modulation obtained by demodulation at the receiver; and at the second station a receiver adapted to receive said modulating frequency and demodulate the same, a transmitter adapted to transmit a carrier wave having the same frequency as the frequency of the aforesaid carrier wave, means at said second station transmitter for locally generating a modulation frequency, a phase discriminator control circuit for maintaining said last mentioned modulation frequency in predetermined phase relation with the modulating frequency as received at the second station, switching means at said second station for periodically and alternately rendering said transmitter and receiver at said second station operative and synchronizing means for synchronizing the operation of said last mentioned switching means with the switching means at the first station whereby the periods of operability of the receiver at the second station correspond with the periods of operability of the transmitter at the first station.

2. In a radio system for measuring the distance between two stations, a pair of related radio stations, including at the first station a source of modulating frequency, a transmitter adapted to transmit the modulating frequency as a modulation of a carrier wave, a receiver adapted to receive said modulating frequency and demodulate the same, switching means for periodically and alternately rendering said transmitter and said receiver operative, means for phase comparing the modulating frequency applied to the transmitter with a similar modulation obtained by demodulation at the receiver; and at the second station a receiver adapted to receive said modulating frequency and demodulate the same, a transmitter adapted to transmit a carrier wave having the same frequency as the frequency of the aforesaid carrier wave, means at the second station for deriving from the received frequency a modulation frequency, a phase discriminator control circuit interconnecting said stations for maintaining said last mentioned modulation frequency in predetermined phase relation with the modulation frequency received at the second station, a time delay circuit disposed in series in the aforesaid control circuit, switching means at said second station for periodically and alternately renderng said transmitter and receiver at said station operative and synchronizing means for synchronizing the operation of said last mentioned switching means with the switching means at the first station whereby the periods of operability of the receiver at the second station correspond with the periods of operability of the transmitter at the first station.

References Cited in the file of this patent

UNITED STATES PATENTS 1,945,952 Nicolson ---------------- Feb. 6, 1934